(12) United States Patent
Galbreath et al.

(10) Patent No.: US 11,457,021 B2
(45) Date of Patent: Sep. 27, 2022

(54) SELECTIVE RATE LIMITING VIA A HYBRID LOCAL AND REMOTE ARCHITECTURE

(71) Applicant: Signal Sciences Corp., Culver City, CA (US)

(72) Inventors: Nicholas Galbreath, Los Angeles, CA (US); Robert Gibson, Culver City, CA (US); Marc Harrison, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 248 days.

(21) Appl. No.: 15/930,692

(22) Filed: May 13, 2020

(65) Prior Publication Data

US 2021/0359978 A1     Nov. 18, 2021

(51) Int. Cl.
*H04L 9/40*     (2022.01)

(52) U.S. Cl.
CPC ...... *H04L 63/1416* (2013.01); *H04L 63/0263* (2013.01); *H04L 63/1425* (2013.01)

(58) Field of Classification Search
CPC ............. H04L 63/0263; H04L 63/1416; H04L 63/1425; H04L 63/1458
See application file for complete search history.

(56) References Cited

U.S. PATENT DOCUMENTS

| | | | | |
|---|---|---|---|---|
| 8,856,926 | B2* | 10/2014 | Narayanaswamy | .... H04L 63/20 726/13 |
| 2009/0254970 | A1* | 10/2009 | Agarwal | ............... G06F 21/554 726/1 |
| 2015/0381660 | A1* | 12/2015 | Hsiung | ............... H04L 41/0816 726/1 |
| 2018/0115471 | A1* | 4/2018 | Curcio | ................ H04L 63/0245 |
| 2018/0115523 | A1* | 4/2018 | Subbarayan | ............ H04L 63/02 |
| 2018/0307833 | A1* | 10/2018 | Noeth | ................. H04L 63/1416 |
| 2021/0203641 | A1* | 7/2021 | Mantin | .................... H04L 63/20 |
| 2022/0029916 | A1* | 1/2022 | Filsfils | .................. H04L 43/106 |

* cited by examiner

*Primary Examiner* — Kristine L Kincaid
*Assistant Examiner* — Alexander R Lapian
(74) *Attorney, Agent, or Firm* — Ansari Katiraei LLP; Arman Katiraei; Sadiq Ansari

(57) ABSTRACT

Systems and methods perform selective rate limiting with a distributed set of agents and a remote controller. An agent receives a packet from a client, and inspects the packet using different rules. Each rule may include at least one different (i) rule definition with traffic dimensions identifying a different attack, (ii) signal with which to identify attack traffic matching the rule definition, (iii) threshold specifying a condition, and (iv) action to implement based on the condition of the threshold being satisfied. The agent provides the signal in response to the packet matching the traffic dimensions from the rule definition of a particular rule. The controller updates a value linked to the signal and a client identifier of the client, and implements the action of the particular rule across the distributed set of agents in response to the value satisfying the condition for the particular rule threshold.

20 Claims, 10 Drawing Sheets

SELECTIVE RATE LIMITING VIA A HYBRID LOCAL AND REMOTE ARCHITECTURE

BACKGROUND

Volumetric attacks are one type of network attack in which one or more attackers may submit a large number of requests or data to a site with malicious intent. Volumetric attacks, such as Distributed Denial-of-Service ("DDOS") attacks, may involve the one or more attackers attempting to render the site and/or site services inaccessible by overwhelming resources with the large number of requests. Other volumetric attacks may use the large number of requests to misappropriate data from the site (e.g., scrap the data from the site), look for vulnerabilities that would allow unauthorized access to or control of the site, and/or other nefarious purposes.

Volumetric attacks my be difficult to detect when the attack traffic is distributed across different nodes and/or different locations of a distributed platform for load balancing and/or other purposes. In particular, the request rate of an attacker is lowered at each node and/or location where the attack traffic is distributed. Even though the overall request rate of the attacker (e.g., the amount of attack traffic that is generated by the attacker) may be sufficient to activate attack protections, each node or location may separately track the request rate of the attacker at that single node or location, and the request rate tracked at each node or location may be insufficient to activate the attack protections.

Volumetric attacks can be launched from one or more devices. The devices may be configured with bots that may obfuscate attack traffic. For instance, an attacker may use a bot to change various properties of the attack traffic (e.g., spoof addressing) so as to better mirror valid traffic and/or valid traffic patterns. As such, it may be difficult to differentiate attack traffic from valid traffic and/or attackers from valid clients when the attack protections are based purely on request rates and/or the request rates are increased upon detecting traffic with a particular attack signature. The attackers may avoid triggering the attack protections by manipulating their attack traffic to blend with valid traffic and/or to mirror request rates of higher volume valid clients.

Even when an attack is detected, traditional attack protections against volumetric attacks may interfere with valid traffic and/or impact valid clients. For instance, an attack may be identified entirely on the amount of traffic that is issued from a client. Such attack identification may be used to prevent an attack from a bot that changes its attack traffic, but this can also lead to blocking of valid clients that submit a high rate of requests as part of a legitimate workflow. In this case, each request from a particular client may be valid, but the attack protections may block the traffic simply because of the rate at which they are issued from the particular client.

DETAILED DESCRIPTION OF PREFERRED EMBODIMENTS

The following detailed description refers to the accompanying drawings. The same reference numbers in different drawings may identify the same or similar elements.

Disclosed are systems and methods for selective rate limiting based on customized rules. The customized rules may adapt the selective rate limiting to protect against different attacks by identifying the attack traffic of different attacks using different signals, customizing thresholds at which different attack protections are activated for each attack, and/or customizing the actions that are implemented when each attack protection is activated. Accordingly, unlike traditional rate limiting that may detect attack traffic and/or an attacker based entirely on the request rate or that may detect different attacks using the same traffic dimension, the selective rate limiting may inspect different traffic dimensions for traffic issued by each client and/or responses sent in reply to the requests, and may differentiate the attack traffic and/or attack signatures of different attacks using the signals that correspond to different traffic dimensions that are indicative of different attacks. Moreover, unlike traditional rate limiting in which a single action may be used to protect against all attacks, the selective rate limiting may implement different protections against the attack traffic of different attacks. In doing so, the selective rate limiting accurately differentiates attack traffic from valid traffic, and/or accurately differentiates attackers from valid clients that may issue traffic at similar request rates or with similar traffic patterns.

Figure 1:
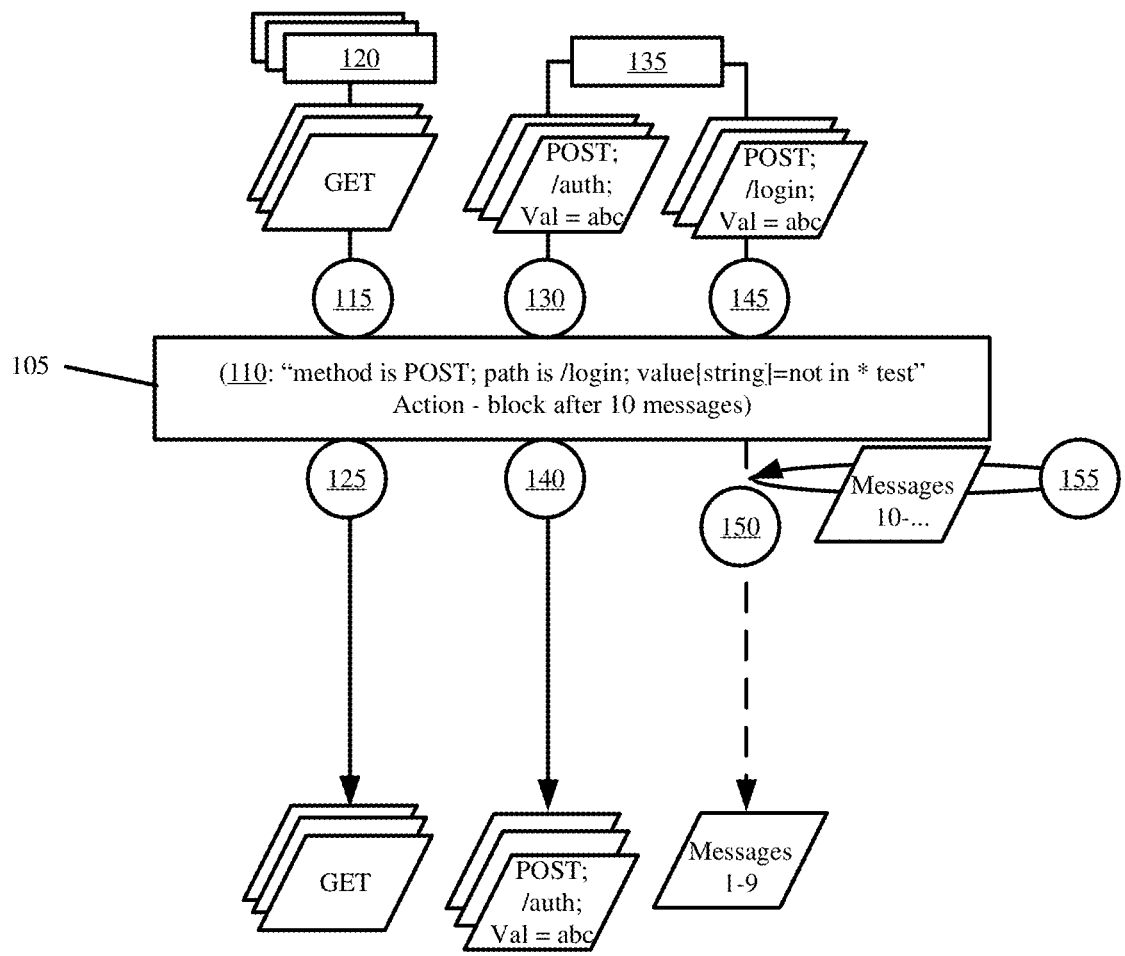
FIG. 1 illustrates an example of selective rate limiting in accordance with some embodiments presented herein.

FIG. 1 illustrates an example of selective rate limiting in accordance with some embodiments presented herein. Selective rate limiting system 105 may be configured with custom-defined rule 110.

Rule 110 may define signals for differentiating traffic with specific values set for specific traffic dimensions as potential attack traffic. The signals may be applied upon to any traffic dimension including different header fields, metadata, Uniform Resource Locator ("URL") parameters, and/or message data. As shown in FIG. 1, rule 110 may include a custom definition that identifies attack traffic as traffic with a POST method, with a path directed to "/login", and a particular value that differs or does not match to a specified wildcard string.

System 105 may receive (at 115) a first set of messages from first of clients 120. First set of clients 120 and/or other clients referenced elsewhere may include one or more devices with network connectivity that issues messages over a data network in order to access content, services, and/or data from a remote device, and/or that facilitate the transfer of the messages to the remote device. Accordingly, first set of clients 120 and/or other clients may refer to client devices and can include computers, smartphones, set-top boxes, gaming devices, wearable devices, communication devices, Internet-of-Things ("IoT") devices, servers, virtualized machines running on network-accessible equipment, sensors, networking equipment, and/or other network-connected equipment.

System 105 may determine that the first set of messages do not satisfy rule 110. In particular, the first set of messages may be GET HyperText Transfer Protocol ("HTTP") messages, and the first set of messages therefore do not satisfy the method traffic dimension (e.g., POST method) of rule 110. Accordingly, system 105 may forward (at 125) the first set of messages to the intended destination. Moreover, system 105 may forward (at 125) the first set of messages without the signals for attack traffic identified by rule 110.

System 105 may receive (at 130) a second set of messages from different client 135. The second set of messages may satisfy the method and the particular value traffic dimensions defined for rule 110, but may be directed to a different path than the path defined for rule 110. Accordingly, system 105 does not signal the second set of messages as attack traffic, and permits (at 140) the second set of messages to pass through to their intended destination.

Client 135 may also provide (at 145) a third set of messages to system 105. System 105 may inspect each of the third set of messages, and may determine that each message of the third set of messages has the specific traffic dimensions set to the specific values that correspond to the attack traffic identified by rule 110. More specifically, each message of the third set of messages may specify a POST method with a path directed to "/login" and a particular value that is different than the specified wildcard string.

System 105 may classify the third set of messages as attack traffic by providing the signals that differentiate the attack traffic from valid traffic, and may begin to track the attack traffic sent by client 135 based on the signals. In some embodiments, system 105 may track the request rate at which client 135 sends the signaled attack traffic (e.g., packets that are provided the signals from rule 110), a count of signaled attack traffic sent by client 135, and/or other metrics associated with sending of the signaled attack traffic.

Rule 110 may include a custom threshold that specifies initiating an attack protection action of rule 110 after a particular client sends 10 messages or requests that are classified as attack traffic under rule 110 within 30 seconds. Accordingly, system 105 may forward (at 150) the first 9 of the third set of messages to the intended destination, and may invoke (at 155) the action defined for rule 110 against subsequently issued messages of the third set of messages from client 135 in response to detecting a $10^{th}$ message within the 30 second interval. In response to invoking (at 155) the action, system 105 may block the subsequently issued messages of the third set of messages from client 135. The selective rate limiting therefore selectively applies the action of rule 110 to the third set of messages from client 135 while allowing the second set of traffic from client 135 and traffic from other clients to pass through without being affected by the action.

As noted above, the selective rate limiting may differentiate attack traffic from other traffic by applying different signals to the attack traffic when the attack traffic is detected to include traffic dimensions and/or values for the traffic dimensions that match the traffic dimensions and/or values for the traffic dimensions defined by rule 110. For instance, continuing from the example of FIG. 1, the third set of messages from client 135 may have matching values for the three traffic dimensions of rule 110, and system 105 may apply one or more signals to identify the third set of messages as a particular type of attack traffic associated with rule 110.

In some embodiments, the signals may be tags that are added as metadata, URL parameters, header values, and/or other parts of the attack traffic. In some embodiments, the signals may be tracked separate from the attack traffic. For instance, system 105 may internally track the signals via a database or other repository.

Figure 2:
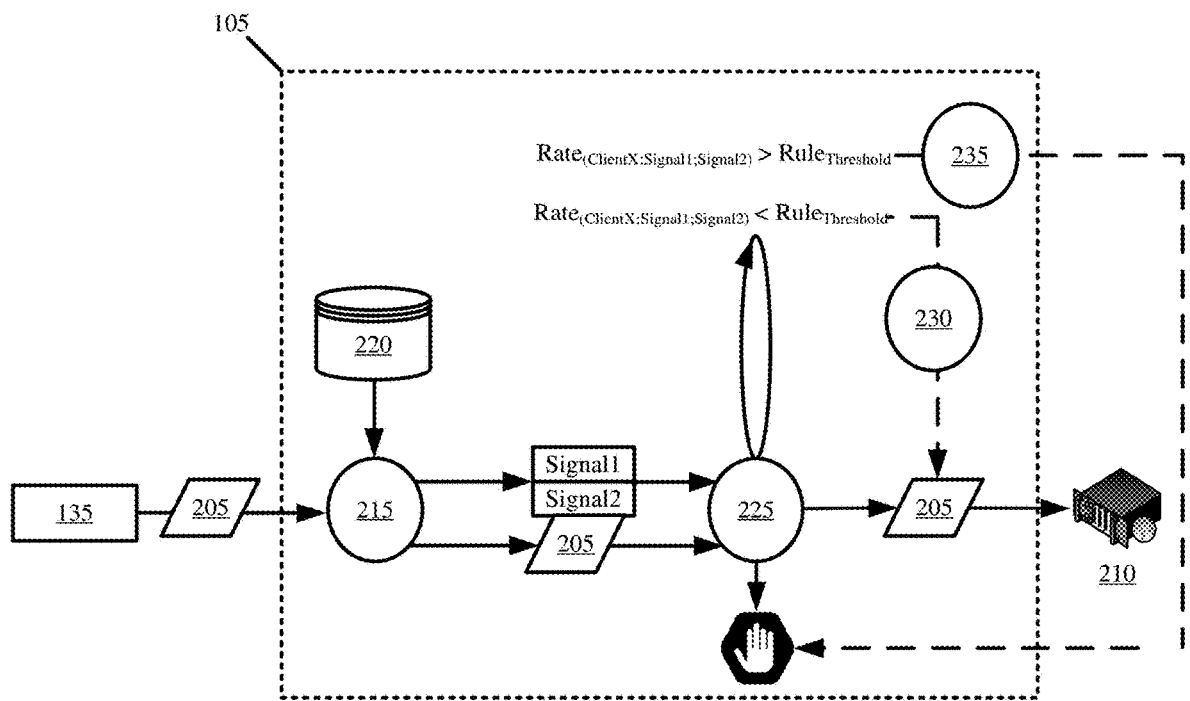
FIG. 2 illustrates an example of the signal-based attack traffic detection and differentiation performed as part of the selective rate limiting of some embodiments.

The selective rate limiting may use the signals to efficiently track different attack traffic sent by different clients. FIG. 2 illustrates an example of the signal-based attack traffic detection and differentiation performed as part of the selective rate limiting of some embodiments.

As shown in FIG. 2, client 135 may issue request 205 that is intended for and/or directed to recipient 210. Request 205 may include an HTTP message and/or messages of other types, formats, and protocols. Intended destination 210 may include a server or other device that provides content, services, and/or data in response to client issued requests, messages, and/or other data packets.

System 105 may protect recipient 210 from attack, and may perform the selective rate limiting against all requests and/or other traffic before those requests and/or traffic reach or are processed by recipient 210. In particular, system 105 may determine (at 215) that request 205 has traffic dimensions that match the rule definition of one or more custom-defined rules. For instance, request 205 may include a first value for a first header field and a second value for a second header field that are defined as traffic dimensions of a particular attack in the one or more custom-defined rules. In some embodiments, the custom-defined rules may be stored in rule repository 220, and each incoming request and/or outgoing response may be compared against the custom-defined rules in rule repository 220. Rule repository 220 may provide local (e.g., on-premises) or remote (e.g., cloud-based) storage of the custom-defined rules.

System 105 may include generating a first signal and a second signal for the request as a result of determining (at 215) that request 205 has traffic dimensions that match the rule definition of one or more custom-defined rules. The one or more custom-defined rules may include the first signal and the second signal as identifiers for the attack traffic that is identified by the one or more custom-defined rules. In some embodiments, generating the first signal and the second signal may include modifying one or more of the header, URL, metadata, and/or message data of request 205 to include the first signal and the second signal. For instance, the first signal and the second signal may be added as a custom header field in request 205 and/or may be added as URL query string parameters that do not affect what is requested by the original URL of request 205. In some embodiments, generating the first signal and second signal may include associating the signals with request 205 and/or client 135 such that the signals can be used to track attack traffic sent by client 135 for different types of attacks.

System 105 may adjust a count and/or a rate for the specific attack traffic that is received from client 135. In some embodiments, the tracked count and/or rate may be adjusted based on the first signal and the second signal and based on a client identifier that identifies client 135, wherein the first signal and the second signal may identify the specific attack traffic for the attack that is defined in the matching rules.

In some embodiments, system 105 may track different counts and/or rates for each client identifier. The different counts and/or rates may correspond to counts and/or rates for attack traffic of different attacks, that are identified with different signals, coming from one or more suspected attackers that are identified by the client identifier. In any case, each tracked count and/or rate may be associated with one or more signals, for identifying the attack traffic that is being tracked, and one or more client identifiers, for identifying the one or more clients that originate the identified attack traffic.

The client identifier may include the Internet Protocol ("IP") address or other addressing (e.g., network address, port number, and user agent combination) by which client 135 may be uniquely identified. In some embodiments, the client identifier may be any unique signature for uniquely identifying client 135.

The unique signature may be based on a combination of header values that may be unrelated to addressing of client 135. For instance, client 135 may be a bot that spoofs its address (e.g., changes the source address in each request), but client 135 may still provide a unique signature in each request based on other static values found in the request headers sent from client 135. In some embodiments, the unique identifier may be based on a cookie, client metadata (e.g., time zone data, primary language data, screen size data, battery charge and lifetime data, operating system data, installed fonts data, etc.), and/or "fingerprints" of the client device.

System 105 may determine (at 225) whether the tracked count and/or rate for the combination of the first signal, the second signal, and the client identifier is sufficient to activate attack protections. The attack protections may be used to protect against attack traffic that is identified by the first signal and the second signal and/or originating from client 135. In determining (at 225) whether to activate the attack protections, system 105 may compare the tracked count and/or rate against a custom threshold that is defined for the attack identified by the first signal and the second signal. In particular, system 105 may obtain the custom threshold from the rule that identifies the attack and/or attack traffic with the first signal and the second signal. The custom threshold that is defined for the implicated rule may be different than the thresholds that are defined for other attacks and/or attack traffic in other rules.

In response to determining (at 225) that the count and/or rate, that is tracked for the client identifier, the first signal, and the second signal, does not satisfy the custom threshold defined in the rule for the attack identified by the first signal and the second signal, system 105 may store the updated count and/or rate, and may forward (at 230) request 205 to intended recipient 210. In some embodiments, the determination (at 225) for activating the attack protections may be performed independent or at a different time than the determination to forward (at 230) request 205. For instance, system 105 may, additionally or alternatively, determine (at 225) whether the traffic associated with the client identifier, the first signal, and the second signal is subject to actions of any previously activated protections. If not, system 105 may forward (at 230) request 205 to intended recipient 210.

In response to determining (at 225) that the tracked count and/or rate, that is tracked for the client identifier, the first signal, and the second signal, satisfies the custom threshold defined in the rule for the attack identified by the first signal and the second signal, system 105 may store the updated the count and/or rate, and may implement (at 235) the attack protections. In some embodiments, the rule for the attack identified by the first signal and the second signal may specify implementing (at 235) the attack protections against traffic with any one or more of the client identifier, the first signal, and the second signal. For instance, implementing (at 235) the attack protections may include blocking all traffic with the client identifier or blocking traffic from any client that includes either or both of the first signal and the second signal. In some embodiments, the rule for the attack identified by the first signal and the second signal may specify implementing (at 235) the attack protections against traffic that is identified by different client identifiers and/or one or more signals that are different than or in addition to the first signal or the second signal. For instance, implementing (at 235) the attack protections may include blocking traffic with the first signal and a third signal that is generated in response to traffic dimensions that match the rule definition of another rule. In embodiments where the determination (at 225) for activating the attack protections is performed independent or at a different time than the decision to forward the traffic or implement the attack protections, system 105 may, additionally or alternatively, determine (at 225) whether the traffic associated with the client identifier, the first signal, and the second signal is subject to actions of any previously activated protections. If yes, system 105 may implement (at 235) the activated protections against request 205.

In some embodiments, the attack traffic may be identified based on traffic dimensions that are present in the client request, and also traffic dimensions that are present in the server response to the client request. In some such embodiments, a rule may specify generating a signal based on one or more traffic dimensions in the client request and/or server response to the client request, and system 105 may adjust the selective rate limiting to account for the signaling generated for the response messaging.

Figure 3:
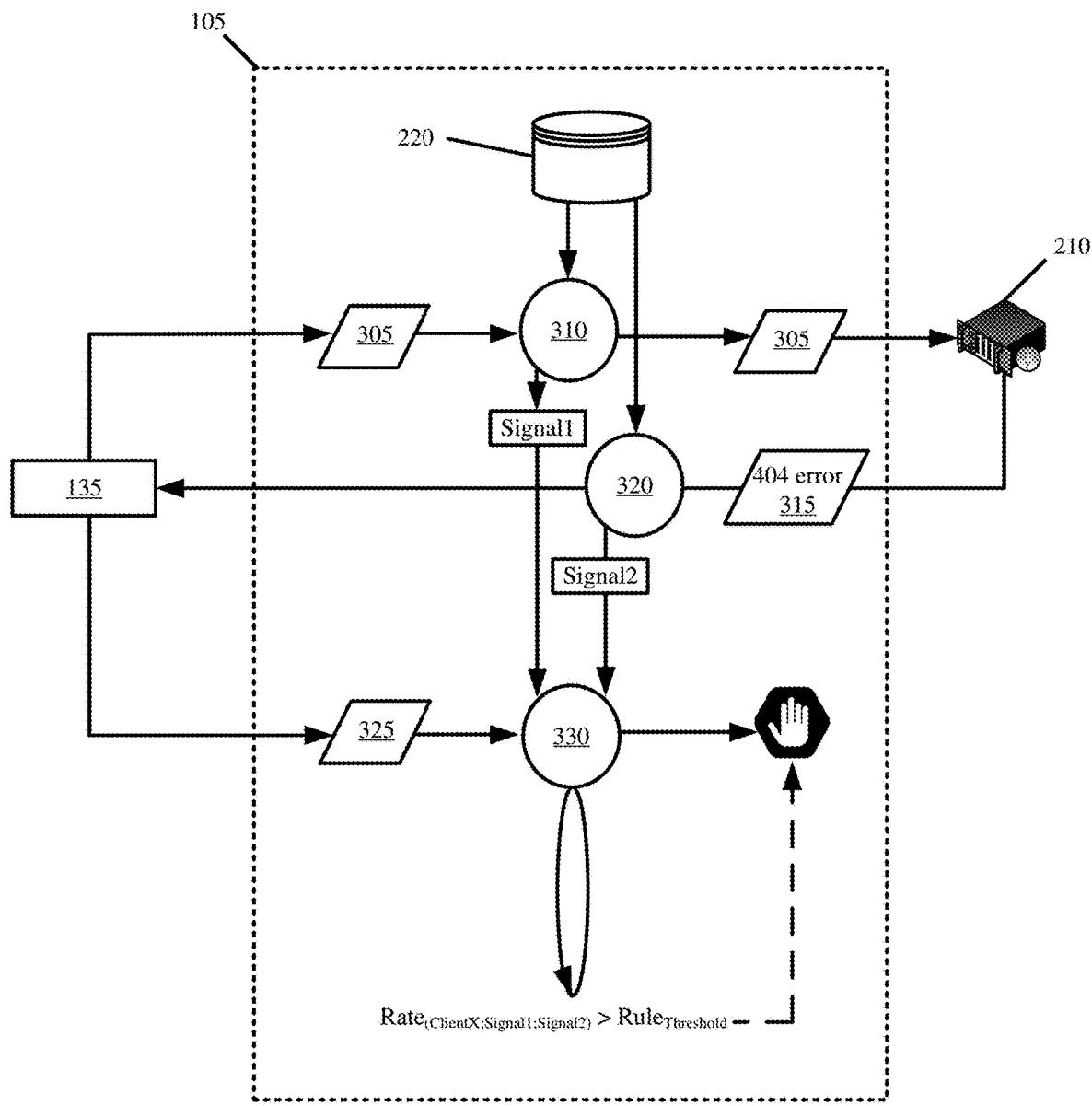
FIG. 3 illustrates an example of signal-based attack traffic detection and differentiation performed on client issued requests and responses to the requests in accordance with some embodiments presented herein.

FIG. 3 illustrates an example of signal-based attack traffic detection and differentiation performed on client issued requests and responses to the requests in accordance with some embodiments presented herein. FIG. 3 illustrates client 135 issuing first request 305 to intended destination 210. As before, system 105 may perform the selective rate limiting on first request 305 before first request 305 arrives at or is processed by intended destination 210.

System 105 may detect that one or more traffic dimensions of first request 305 match to a custom-defined rule definition from rule repository 220 for a particular type of attack. Accordingly, system 105 may provide (at 310) a first signal to identify first request as potential attack traffic for the particular type of attack, may determine that there is no count and/or rate tracked for the first signal or no attack threshold associated with the first signal in the custom-defined rule definition, and may forward (at 310) first request 305 to intended destination 210.

Destination 210 may provide response message 315 upon processing first request 305. System 105 may inspect response message 315 and/or other outgoing traffic from destination 210. The response message may contain an error code (e.g., 404 Not Found) or other traffic dimension that is specified in the custom-defined rule. For instance, the custom-defined rule may detect an attack that uses valid requests to achieve an unauthorized result (e.g., guess or search for a code with monetary value, guess login information, scan for a security vulnerability, provide queries to misappropriate information, etc.).

In response to inspecting response message 315, system 105 may provide (at 320) a second signal based on one or more traffic dimensions of response message 315 matching the custom-defined rule from which the first signal was identified for request 305. System 105 may associate the second signal to the first signal based on request 305 and response message 315 containing a common client identifier (e.g., IP address of client 135) and/or based on system 105 determining that response message 315 is part of the same session, connection, and/or interaction between client 135 and destination 210 that involved request 305.

System 105 may adjust (at 330) a count and/or rate that is tracked for the combination of the first signal, the second signal, and the client identifier for client 135. Based on the adjusted count and/or rate, system 105 may determine (at 330) that the tracked count is sufficient to activate the attack protections associated with the custom-defined rule. In this example, the activated attack protections may apply to all subsequent traffic that is issued by client 135 or subsequent traffic that is identified with the first signal.

System 105 may provide response message 315 to client 135, and client 135 may issue second request 325 to intended recipient 210. Once again, system 105 may receive second request 325 before intended recipient 210. System 105 may inspect second request 325 to identify that second request 325 is associated with the client identifier of client 135 and/or the first signal.

Based on the prior activation of the attack protections with respect to the client identifier and/or traffic identified with the first signal, system 105 may block second request 325. In some embodiments, the activated attack protections may block all traffic from client 135 and/or all traffic associated with the client identifier of client 135 for a specified period of time or specified number of requests. In some other embodiments, the activated attack protections may block any request with the client identifier of client 135 that is also identified with the first signal, while permitting other requests with the client identifier of client 135 to pass to intended destination 210. In any case, the activated attack protections may prevent client 135 from using valid traffic to achieve an unauthorized result. More specifically, the attack protection actions implemented by system 105 may prevent client 135 from issuing additional requests in an attempt to guess a code for redeeming a gift card with a monetary value, guess login information, find a security vulnerability, and/or submit database queries to misappropriate information.

Figure 4:
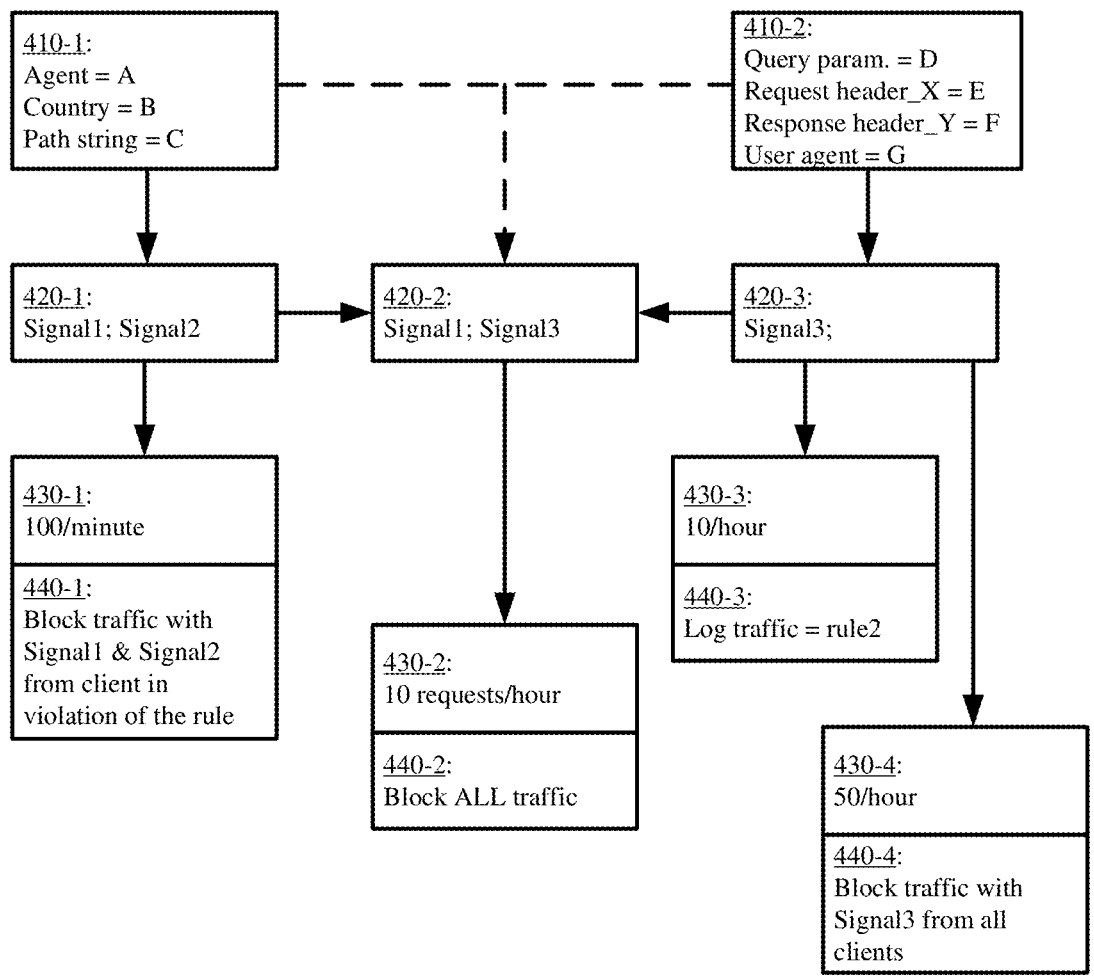
FIG. 4 illustrates examples of different custom-defined rules that may be enforced by a selective rate limiting system in accordance with some embodiments presented herein.

FIG. 4 illustrates examples of different custom-defined rules that may be enforced by selective rate limiting system 105 in accordance with some embodiments presented herein. FIG. 4 illustrates rule definitions 410-1 and 410-2, signals 420-1, 420-2, and 420-3, attack thresholds 430-1, 430-2, 430-3, and 430-4, and attack protection actions 440-1, 440-2, 440-3, and 440-4. Rule definitions 410-1 and 410-2 may be collectively referred to as rule definitions 410 or individually as rule definition 410; signals 420-1, 420-2, and 420-3 may be collectively referred to as signals 420 or individually as signal 420; attack thresholds 430-1, 430-2, 430-3, and 430-4 may be collectively referred to as attack thresholds 430 or individually as attack threshold 430; and attack protection actions 440-1, 440-2, 440-3, and 440-4 may be collectively referred to as attack protection actions 440 or individually as attack protection action 440. Each rule may include one or more rule definitions 410, signals 420, attack thresholds 430, and/or attack protection actions 440.

Rule definitions 410 may specify traffic dimensions and/or specific values of traffic dimensions by which to detect attack traffic of different attacks. Stated differently, each rule definition 410 may specify the header values, URL parameters, metadata, and/or message data in a client-issued message and/or a server-issued response that correspond to the signature of a different attack. Each rule definition 410 may be defined with one or more key-value pairs. The key of a key-value pair may identify the header field, URL parameter, metadata attribute, and/or data within the message body for identifying a traffic dimension of attack traffic. The value of the key-value pair may provide a string, characters, enumerated list, name and value combination, wildcards, and/or values for differentiating packets with the traffic dimension as attack traffic or valid traffic. Keys of an example set of traffic dimensions that may be used to define rule definitions 410 may include: agent name, country, domain, IP address, method, path, POST parameter, query parameter, request cookie, request header, response code, response header, scheme, and user agent.

One or more signals 420 may be linked to a rule definition 410, and may be used to differentiate the attack traffic and/or attack identified by that rule definition 410. System 105 may also use signals 420 as an efficient means of tracking counts and/or rates of different attack traffic that is detected from different clients.

System 105 may generate signals 420-1 for requests, responses, messages, data packets, and/or other traffic with traffic dimensions that match those defined by rule definition 410-1. In some embodiments, generating signals 420-1 may include providing signals 420-1 to update a value tracking different attack traffic issued by a client. In some embodiments, generating signals 420-1 may include tagging or otherwise associating signals 420-1 to the header, URL, metadata, and/or message body of traffic with traffic dimensions that match those defined by rule definition 410-1.

Signals 420 may be defined as specific or arbitrary identifiers. For instance, attack traffic of rule definition 410-1 may be identified by signals "XSS-header1" and "XSS-URL", and attack traffic of rule definition 410-3 may be identified by signal "GiftCodeAttack".

In some embodiments, an attack may be defined by using different combinations of signals 420 that are associated with two or more rule definitions 410 and/or other attacks. For instance, signals 420-2 may identify a specific attack based on a first signal that is provided to traffic with traffic dimensions matching rule definition 410-1 and a second signal that is provided to traffic with traffic dimensions matching rule definition 410-2.

One or more thresholds 430 may be linked to one or more signals 420. Thresholds 430 may define conditions at which to activate attack protections against attack traffic identified by the linked one or more signals 420. For instance, threshold 430-1 may be linked to signals 420-1 that identify a first attack or first attack traffic, and may set a first condition for activating a first attack protection against a client sending the first attack traffic identified by signals 420-1 with a count and/or rate that exceeds or satisfies the condition of threshold 430-1. Threshold 430-2 may be linked to signals 420-2 that identify a second attack or second attack traffic, and may set a different second condition for activating a second attack protection against a client sending the second attack traffic identified by signals 420-2 with a count and/or rate that exceeds or satisfies the condition of threshold 430-2. In this manner, thresholds 430 may be used to customize the scale of different attacks, and how much attack traffic to permit for different attacks before initiating countermeasures.

In some embodiments, a rule with a particular rule definition 410 and set of signals 420 may have one or more thresholds 430 that must be satisfied before activation of an attack protection. For instance, activation of an attack protection may be conditioned on a first threshold 430 that is satisfied when a particular client sends 100 attack traffic packets identified with a particular signal, and a second threshold 430 that is satisfied when the particular client sends the attack traffic packets identified with the particular signal at a specific rate (e.g., 10 attack traffic packets per second).

In some embodiments, a rule may have two or more thresholds 430 that activate different attack protection actions for the same attack traffic or same attack based on different conditions associated with each of the two or more thresholds 430. For instance, a client may send attack traffic at a first rate that satisfies a first threshold 430 for activating a less restrictive attack protection action. The client may increase the amount or rate of the attack traffic to satisfy a second threshold 430 for activating a more restrictive attack protection action.

Each threshold 430 may be defined based on a count, rate, frequency, time, and/or other values associated with the attack traffic that is identified by the one or more signals 420 linked to that threshold 430. A threshold 430 defined based on a count may be time agnostic. For instance, a time agnostic threshold 430 may activate an attack protection upon receiving a set number of attack traffic packets with the one or more signals 420 from one or more clients regardless of how long it takes to receive the set number of attack traffic. A threshold 430 defined based on a rate may be time-specific. For instance, the rate for a particular threshold 430 may specify how much attack traffic from one or more clients in a given amount of time or interval is sufficient to satisfy the condition of the particular threshold 430.

An attack protection action 440 may be associated with one or more thresholds 430. Each action 440 may customize the attack protection that is implemented against clients sending attack traffic that triggers the one or more associated thresholds 430. Accordingly, actions 440 may be used to select different attack protections for different attacks or attack traffic, and/or the application scope of the selected attack protection.

Selecting the attack protection for an action 440 may include selecting between different predefined attack protections supported by system 105 and/or custom-defined attack protections. For instance, the different predefined attack protections may include blocking attack traffic, redirecting attack traffic, logging attack traffic, and/or forcing the client to prove it is not a bot by solving a problem (e.g., providing a CAPTCHA test). Custom-defined attack protections may include machine-executable code that is generated for and/or uploaded to system 105. The machine-executable code may include a script, an application, and/or instructions or commands.

Selecting the application scope of an attack protection may include defining what traffic is subject to the attack protection. For instance, the scope of the attack protection may be set to include attack traffic with the signals that identify a particular attack and that originate from a particular client, all traffic that is issued by the particular client (e.g., traffic with or without the signals identifying the particular attack), attack traffic with the signals that identify the particular attack and that are issued by any client, or a specified set of traffic that may include or may be different than the attack traffic (e.g., traffic with signals that differ from the signals used to identify the attack traffic).

In some embodiments, each action 440 may include an expiration value. The expiration value may specify a duration that action 440 is implemented upon being activated, or a number of packets to enforce action 440 against upon being activated. Once the expiration value for an activated and/or implemented action 440 is reached, system 105 may deactivate that action 440. A deactivated action 440 is not implemented or performed against attack traffic.

System 105 may provide a graphical user interface ("GUI") for defining the rules (e.g., rule definitions 410, signals 420, thresholds 430, and/or actions 440). The rules may also be defined programmatically via a set of application programming interface ("API") calls or via uploading of rules into system 105.

Figure 5:
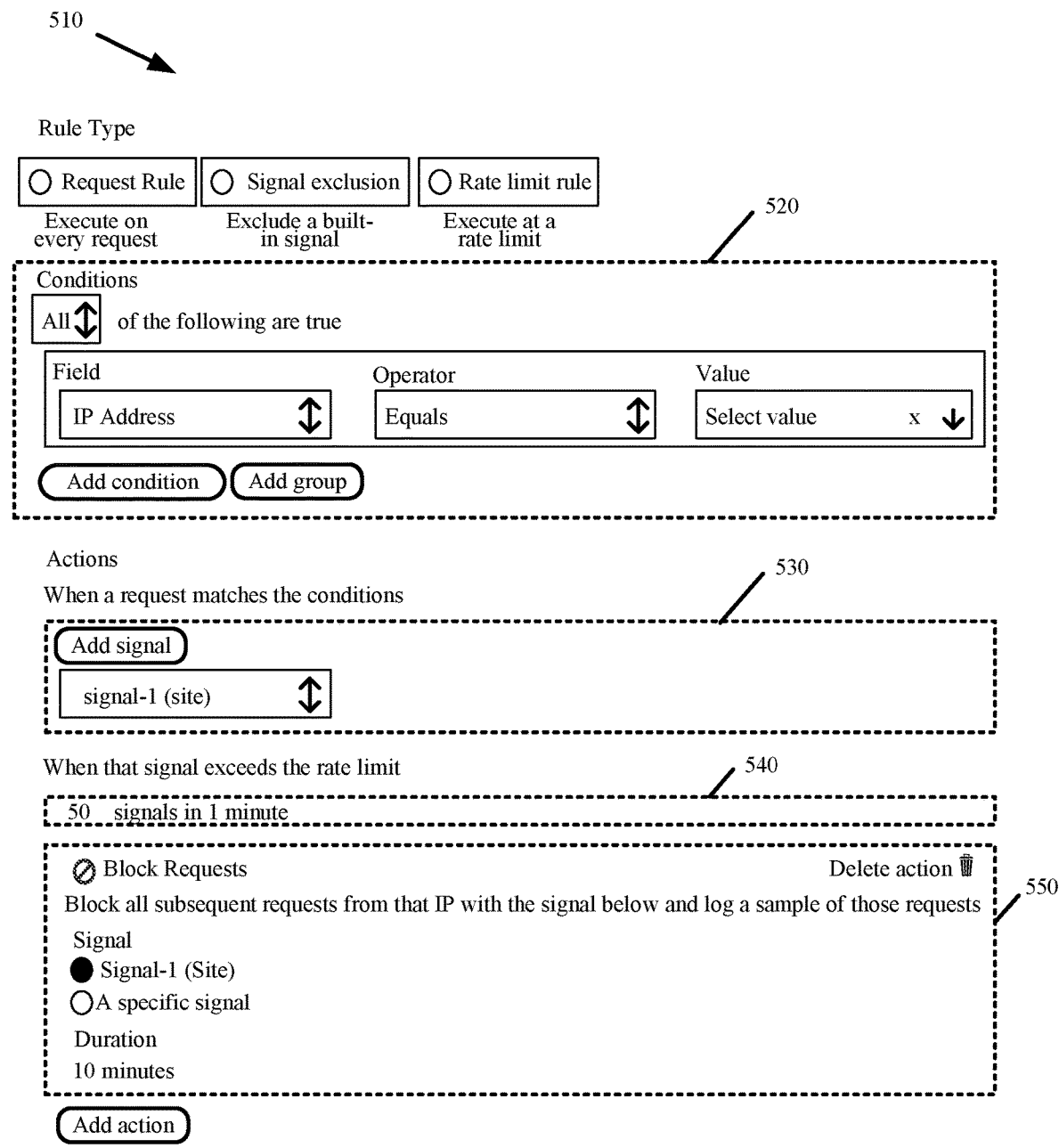
FIG. 5 presents an example graphical user interface ("GUI") for rule generation in accordance with some embodiments presented herein.

FIG. 5 presents example GUI 510 for rule generation in accordance with some embodiments presented herein. GUI 510 may include interactive rule definition controls 520, signal controls 530, threshold controls 540, and/or action controls 550.

Rule definition controls 520 may be used to generate the rule definition for a particular rule. As shown in FIG. 5, rule controls 520 may be used to set a rule condition field, operator, and value. Other embodiments may include additional options for defining the rule definition.

The rule condition field may specify a traffic dimension for inspection. The value may set one or more rule definition values to compare against the traffic dimension of an inspected data packet. The operator may specify a comparison condition for comparing the rule definition value against the data packet traffic dimension value. The operator can be used to specify whether the data packet traffic dimension value is to match, be different than, be greater than, be less than, or have some other condition than the rule definition value.

Rule controls 520 may also be used to add new conditions for a rule definition and/or group different rule conditions as part of a single rule definition. Rule controls may provide drop-down and/or other interactive GUI elements for defining the rule definition.

Signal controls 530 may be used to define the one or more signals for identifying the attack traffic that is identified with the rule definition. In other words, signal controls 530 may define one or more signals that system 105 may use to differentiate the attack traffic that matches the conditions that are specified with rule controls 520.

Threshold controls 540 may be used to set one or more thresholds for activating an attack protection action. In FIG. 5, threshold controls 540 may be tied to a specific rate of attack traffic. In some embodiments, threshold controls 540 may be used to define thresholds based on a count, frequency, time, and/or other values associated with the attack traffic identified with the signals set using signal controls 530.

Action controls 550 may be used to select one or more attack protections and the scope of the attack protections for an action that is implemented when one or more thresholds defined by threshold controls 540 are triggered. The one or more attack protections may specify how system 105 reacts to attack traffic that matches rule definition, and/or reacts to attack traffic that is identified with the defined signals. The scope of the attack protection may specify what clients and what traffic may be subject to the attack protections upon activation of the action. Action controls 550 may include a setting for specifying the duration at which the attack protections remain active.

In some embodiments, the selective rate limiting and system 105 are implemented using a hybrid local and remote architecture. The hybrid local and remote architecture may locally implement the rule-based traffic differentiation and attack protection enforcement at or in conjunction with nodes and/or locations of a distributed platform that correspond to intended destinations for the supplied traffic. The hybrid local and remote architecture may remotely implement the per client tracking of attack traffic, activation of attack protections based on the tracking, and/or dynamic generation of rules. The local and remote operations may be performed asynchronously and/or in parallel with one another.

Figure 6:
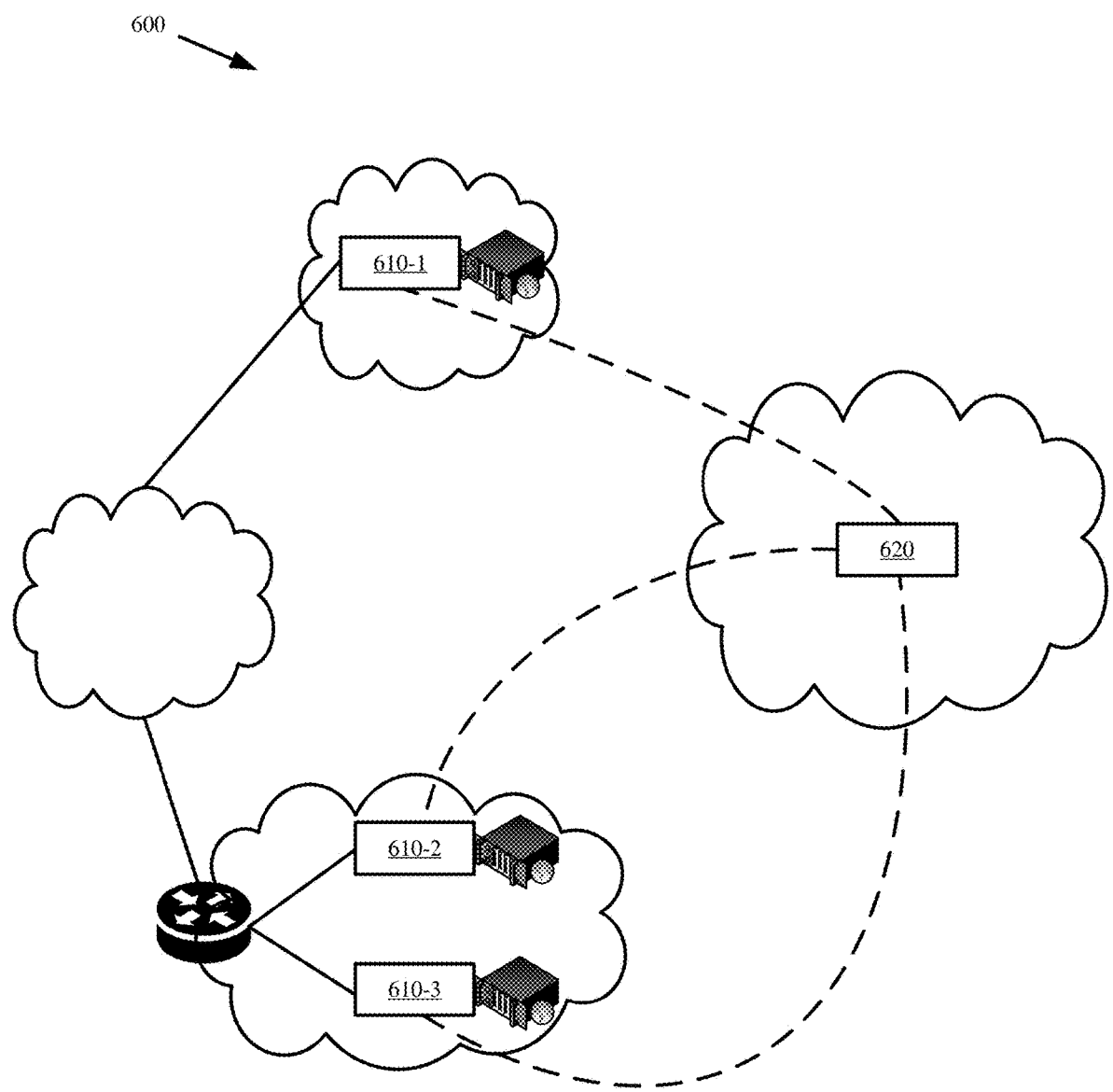
FIG. 6 presents an example hybrid local and remote architecture for implementing the selective rate limiting in accordance with some embodiments presented herein.

FIG. 6 presents example hybrid local and remote architecture 600 for implementing the selective rate limiting in accordance with some embodiments presented herein. Architecture 600 may include agents 610-1, 610-2, and 610-3 (sometimes referred to individually as "agent 610" or collectively as "agents 610"), and controller 620. Agents 610 and controller 620 may comprise the primary components of system 105.

Agents 610 may be distributed across different locations, sites, and/or deployments of a distributed platform. Agents 610 may execute within each distributed platform location. Each agent 610 may protect one or more nodes at the distributed platform locations from attack. Each node may be a device (e.g., server) or cluster of devices at which content, services, and/or data of the distributed platform may be accessed by clients.

Agents 610 may be installed to run on the same physical hardware as the nodes or on separate hardware in the network path to the nodes. For instance, agents 610 may be installed to run in conjunction with servers of the distributed platform, gateway routers at a network point of ingress into a distributed platform location, load balancers that distribute requests across nodes of a particular distributed platform location, and/or other devices or equipment in the distributed platform location.

When running in conjunction with a server node, agent 610 may execute as a small "lightweight" extension of the server node. For instance, agent 610 may include an in-line module for inspecting network traffic (e.g., requests, messages, and/or data packets) prior to the server node receiving and/or processing the traffic. For instance, the in-line module may connect via a local domain socket or a loopback interface, and may intercept traffic entering and exiting a network interface of the server node via the local domain socket or loopback interface.

In some embodiments, agents 610 may be installed outside the distributed platform location. In some such embodiments, routing tables and/or network paths may be modified so that all ingress and/or egress traffic for one or more nodes in a particular distributed platform location are routed through an agent 610.

Controller 620 may be located remote from one or more agents 610. In some embodiments, controller 620 may be implemented on configurable "cloud" resources so that controller 620 may be scaled as needed. Resources of controller 620 may be scaled to track request counts and/or rates for more or less clients, to enforce more or less rules, and/or to handle interactions with more or less agents 610.

Figure 7:
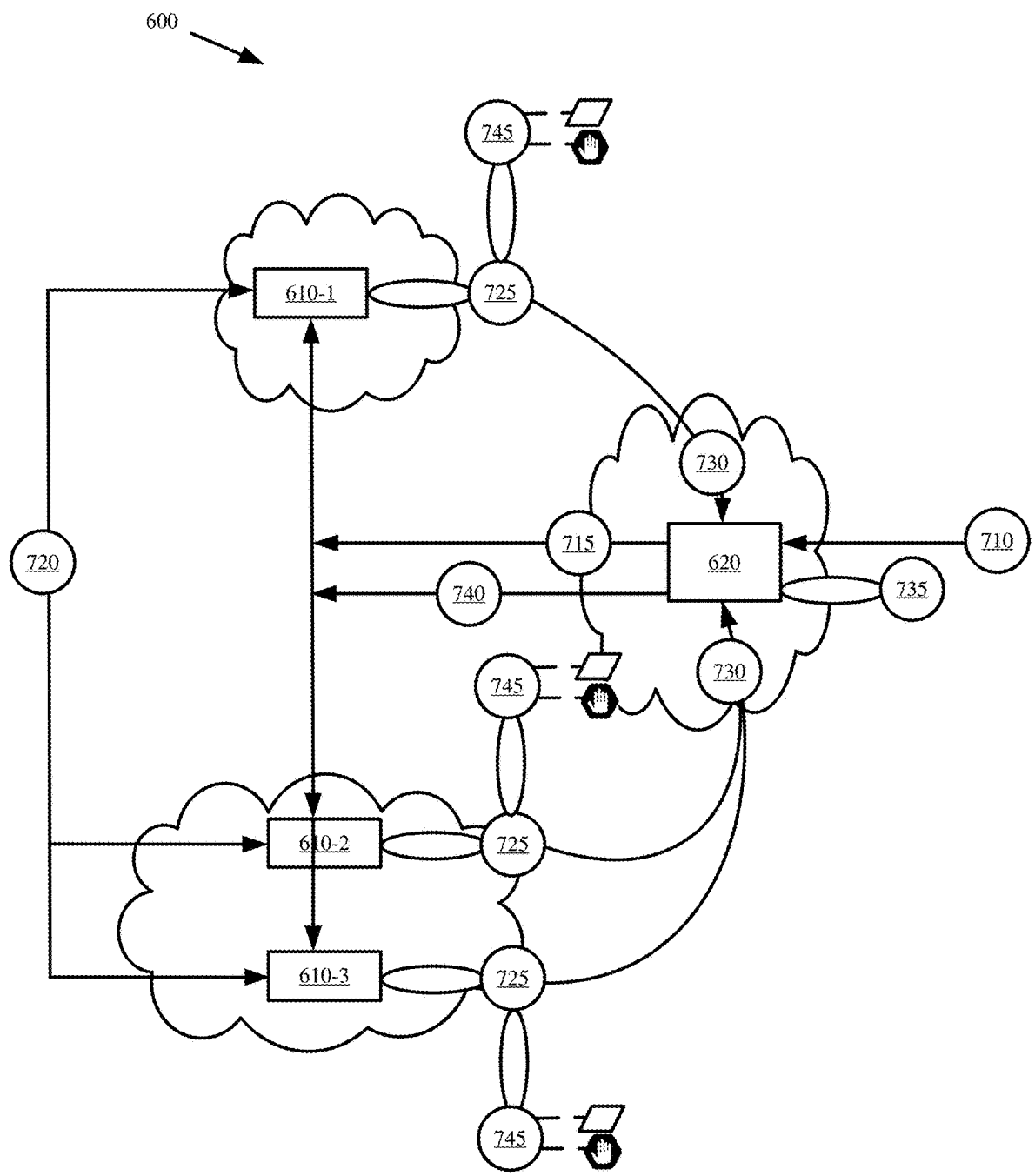
FIG. 7 illustrates an example of the coordinated execution of the selective rate limiting using agents and a controller in accordance with some embodiments presented herein.

FIG. 7 illustrates an example of the coordinated execution of the selective rate limiting using agents 610 and controller 620 in accordance with some embodiments presented herein. Controller 620 may obtain (at 710) a set of custom-defined rules for identifying and protecting against different attacks. Controller 620 may provide (at 715) the set of custom-defined rules to agents 610, wherein agents 610 operate from or at different distributed platform locations and/or protect different distributed platform nodes from the attacks identified via the set of custom-defined rules.

Agents 610 may receive (at 720) packets, requests, messages, data, and/or other traffic, that are sent by various clients, before the traffic is processed by the distributed platform nodes. Agents 610 may inspect (at 725) the traffic. As part of the inspection (at 725), agents 610 may generate signals for any traffic with traffic dimensions that match a rule definition of one or more of the set of custom-defined rules. By comparing the signals generated for the received traffic to signals of active attack protections, agents 610 may forward unrestricted traffic (e.g., traffic that is not identified with signals of active attack protections) to the intended distributed platform nodes, and may implement attack protections against attack traffic that is identified with signals of the active attack protections.

Agents 610 may provide (at 730) controller 620 with the signals that were used to identify the received traffic, and/or the client identifiers for the clients that sent the traffic identified with the signals. For example, for each packet, request, and/or message that is provided one or more signals by an agent 610, that agent 610 may provide to controller 620, the one or more signals and the client identifier for the client sending that packet, request, and/or message.

Controller 620 may track different attack traffic coming from different clients based on the received signals and client identifiers. In some embodiments, controller 620 may track a different count, rate, frequency, time, and/or other values for signals of different attacks and/or attack traffic coming from each client. For instance, controller 620 may track a first request rate for packets that are associated with a first client identifier of a first client and that are identified with a first signal of a first attack, a second request rate for packets that are associated with the first client identifier and that are identified with a second signal of a different second attack, a third request rate for packets that are associated with a different second client identifier of a second client and that are identified with the first signal of the first attack, and a fourth request rate for the packets associated with the second client identifier and that are identified with the second signal of the second attack.

Controller 620 may determine (at 735) if the tracked values for any client satisfy and/or exceed a threshold of any of the configured rules. Controller 620 may determine (at 735) that the tracked value associated with a particular client identifier and a particular signal triggers an attack protection by satisfying the threshold of a particular rule, wherein the particular rule may use the particular signal to identify attack traffic of a particular attack. Accordingly, controller 620 may activate (at 740) the attack protection of the particular rule.

Activating (at 740) the attack protection may include controller 620 providing the attack protection and/or commands to each agent 610. In particular, controller 620 may provide one or more actions of the attack protection for each agent 610 to implement, one or more client identifiers to which the actions apply, and/or signals for the attack traffic that is subject to the actions. In other words, controller 620 may direct each of the agents 610 on a subset of traffic from a subset of clients that will be subject to the activated (at 740) attack protection.

As shown in FIG. 7, controller 620 may activate (at 740) the attack protection of the particular rule on all agents 620. In some embodiments, controller 620 may selectively activate (at 740) the attack protection of the particular rule on a subset of agents 610 that receive the attack traffic or the attack traffic at the rate that was sufficient to activate the attack protection, wherein the subset of agents 610 may be identified based on the signaling and client identifiers that are provided (at 730) to controller.

In response to activating (at 740) the attack protection, agents 610 may continue to inspect incoming traffic, may add signals to the traffic according to the configured rules, and may perform (at 745) the actions of the activated attack protection against any traffic that is identified with the particular signal of the activated attack protection and one or more client identifiers that are subject to that activated attack protection. Accordingly, a first client may send traffic that agent 610 identifies with the particular signal of the activated attack protection, and that agent 610 may forward the traffic to an intended distributed platform node when the client identifier of the first client does not match the client identifier that is subject to the activated attack protection. A second client may send traffic that agent 610 also identifies with the particular signal of the activated attack protection, and that agent 610 may perform (at 745) the attack protection actions on that traffic when the client identifier of the second client matches the client identifier that is subject to the activated attack protection. Agent 610 may forward other traffic from the second client to an intended distributed platform node even though the client identifier of the second client matches the client identifier that is subject to the activated attack when the other traffic is not identified with the particular signal of the activated attack protection.

FIG. 7 illustrates a benefit of hybrid local and remote architecture 600. The benefit includes identifying an attack commencing or occurring at one agent 610 or a first agent 610, and activating the attack protections across all agents 610 before the other agents 610 identify or experience the same attack.

Another benefit of hybrid local and remote architecture 600 may include distributed attack detection. For instance, controller 620, via signaling provided by different agents 610, may track the overall request rate of a particular client despite requests and/or other traffic from the particular client being distributed across different nodes or locations of a distributed platform where the different agents 610 operate. The distributed attack detection may enable a faster response to an attack across the distributed platform by detecting an attack based on cumulative traffic received by agents 610, and implementing attack protections across agents 610 based on aggregated counts and/or rates that are derived from the cumulative traffic received by two or more different agents 610.

Figure 8:
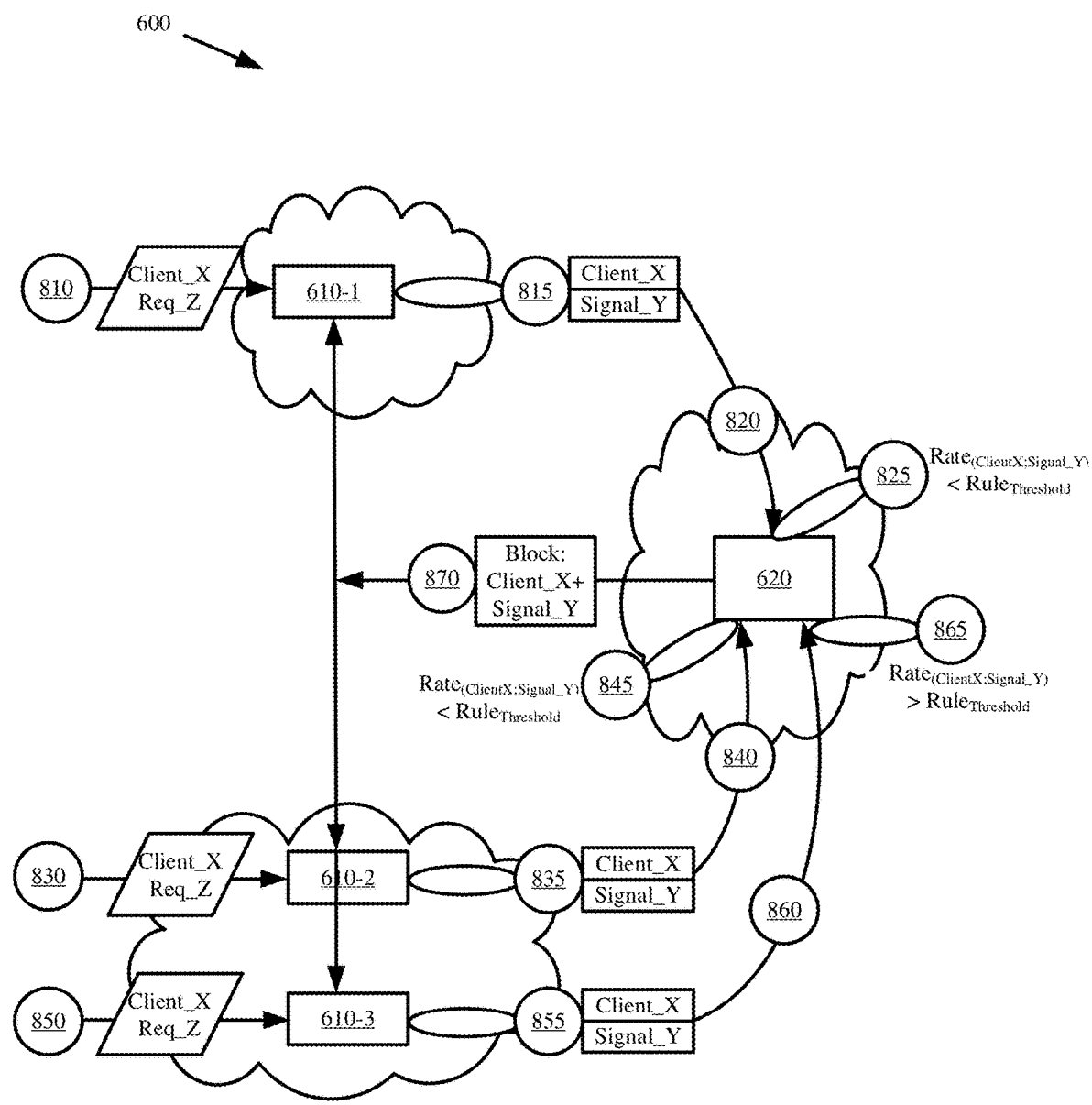
FIG. 8 illustrates an example of distributed attack detection using agents and the controller in accordance with some embodiments presented herein.

FIG. 8 illustrates an example of distributed attack detection using agents 610 and controller 620 in accordance with some embodiments presented herein. A particular client may send (at 810) a first packet to a first node of a distributed platform at which first agent 610-1 runs. First agent 610-1 may inspect (at 815) the first packet according to a configured set of rules prior to the first node processing the first packet, and may identify (at 815) the first packet with a particular client identifier for the particular client and a particular signal based on traffic dimensions of the first packet matching the rule definition of a particular rule that identifies attack traffic with the particular signal.

First agent 610-1 may provide (at 820) the particular client identifier and the particular signal for the first packet to controller 620. Controller 620 may update a tracked count and/or rate for the particular client identifier and the particular signal based on the provided (at 820) messaging from first agent 610-1. Controller 620 may determine (at 825) that the tracked count and/or rate does not satisfy a threshold for activating the attack protections of the particular rule. First agent 610-1 may send the first packet to the first node because no attack protections have been activated to restrict traffic with the particular client identifier and/or the particular signal.

The particular client may send (at 830) a second packet to a second node of the distributed platform at which second agent 610-2 runs. The second packet may be passed to the second node instead of the first node because of load balancing, request routing, and/or network addressing. Second agent 610-2 may operate independent of first agent 610-1, may operate at a different location than first agent 610-1, and/or may operate to protect a different node (e.g., the second node) of the distributed platform from attack traffic than first agent 610-1. Like first agent 610-1, second agent 610-2 may inspect (at 835) the second packet according the same or similar configured set of rules as first agent 610-1 and/or prior to the second node processing the second packet.

Second agent 610-2 may identify (at 835) the second packet with the particular client identifier for the particular client and the particular signal based on the traffic dimensions of the second packet matching the rule definition of the particular rule that identifies attack traffic with the particular signal. Second agent 610-2 may provide (at 840) the particular client identifier and the particular signal for the second packet to controller 620.

Controller 620 may update the tracked count and/or rate for the particular client identifier and the particular signal based on the messaging from second agent 610-2. Controller may determine (at 845) that the tracked count and/or rate for the particular client identifier and the particular signal does not satisfy the threshold for activating the attack protections of the particular rule. Accordingly, second agent 610-2 may send the second packet to the second node because no attack protections have been activated to restrict traffic with the particular client identifier and/or the particular signal.

The particular client may send (at 850) a third packet to a third node of the distributed platform at which third agent 610-3 runs. In some embodiments, the particular client may purposely distribute the first, second, and third packets to different nodes and/or locations of a distributed platform in an attempt to hide attack traffic. In some embodiments, routing and/or load distribution devices of the distributed platform may distribute the first, second, and third packets from the particular client to the different nodes and/or locations of the distributed platform for load balancing and/or management purposes.

Third agent 610-3 may inspect (at 855) the third packet according to the same or similar set of configured rules as used by other agents 610-1 and 610-2 and prior to the third node processing the third packet. Third agent 610-3 may identify (at 855) the third packet with the particular client identifier for the particular client and the particular signal based on the traffic dimensions of the third packet matching the rule definition of the particular rule. Third agent 610-3 may provide (at 860) the particular client identifier and the particular signal for the third packet to controller 620.

Controller 620 may update the tracked count and/or rate for the particular client identifier and the particular signal. The tracked count and/or rate is the result of controller 620 aggregating the signals and/or client identifiers for traffic (e.g., the first packet, the second packet, and the third packet) that the particular client sends to different agents 610 that operate to protect different locations and/or nodes of the distributed platform.

Controller 620 may determine (at 865) that the tracked count and/or rate, that is compiled based on messaging from first agent 610-1, second agent 610-2, and third agent 610-3, satisfies the threshold for activating the attack protections of the particular rule. Controller 620 may activate (at 870) the attack protections of the particular rule in response to the threshold being triggered.

Activating (at 870) the attack protections may include controller 620 providing agents 610 with one or more actions to invoke against traffic identified by the particular client identifier (e.g., traffic that is sent by the particular client) and the particular identifier (e.g., traffic with traffic dimensions that match the rule definition of the particular rule). In some embodiments, controller 620 may activate (at 870) the attack protections against traffic other than attack traffic coming from the particular client and/or having the particular client identifier. In some embodiments, controller 620 may activate (at 870) the attack protections against traffic identified by other clients sending traffic identified with the particular signal, other traffic from the particular client, and/or variations thereof. For instance, the particular rule may include an action that is to be performed against all traffic originating with the client identifier or against traffic originating from any client identifier that is identified with the particular signal. In any case, agents 610 may perform the activated attack protections against the identified attack traffic coming from any identified attackers (e.g., client devices).

In some embodiments, hybrid local and remote architecture 600 may provide flexibility with regards to the operations that are performed by agents 610 and controller 620. In some embodiments, the traffic inspection overhead and signaling of traffic can be shifted from agents 610 to controller 620. For instance, agents 610 may extract the header from received traffic, and may provide the extracted headers to controller 620. Controller 620 may inspect the headers using the configured set of rules, and may generate signals based on features from the extracted headers matching one or more rule definitions. Controller 620 may update the tracked counts and/or rates based on the signals and client identifiers, and may activate attack protections across agents 610 in response to detected attacks. In some such embodiments, agents 610 perform header extraction and forwarding which are less resource intensive than inspecting traffic against the configured set of rules and generating signals to the traffic based on the rules. In some such embodiments, agents 610 may continue performing and/or enforcing attack protection actions that have been activated by controller 620.

In some embodiments, controller 620 may use machine learning and/or artificial intelligence in order to detect new attacks and to dynamically generate rules to protect against those new attacks using the data that is aggregated from the distributed set of agents 610. For instance, the machine learning and/or artificial intelligence may detect request rates and/or other request patterns of an attack that is not covered by a current set of rules, and may generate a custom rule definition, signals, thresholds, and/or actions with which agents 610 can detect the attack traffic and take action against that attack traffic. In this manner, system 105 may proactively adapt to previously unknown attacks.

In some embodiments, the machine generated rules along with the set of suspected attack traffic may be presented to an administrator. The administrator may elect whether to implement one or more of the machine generated rules within selective rate limiting system 105.

Figure 9:
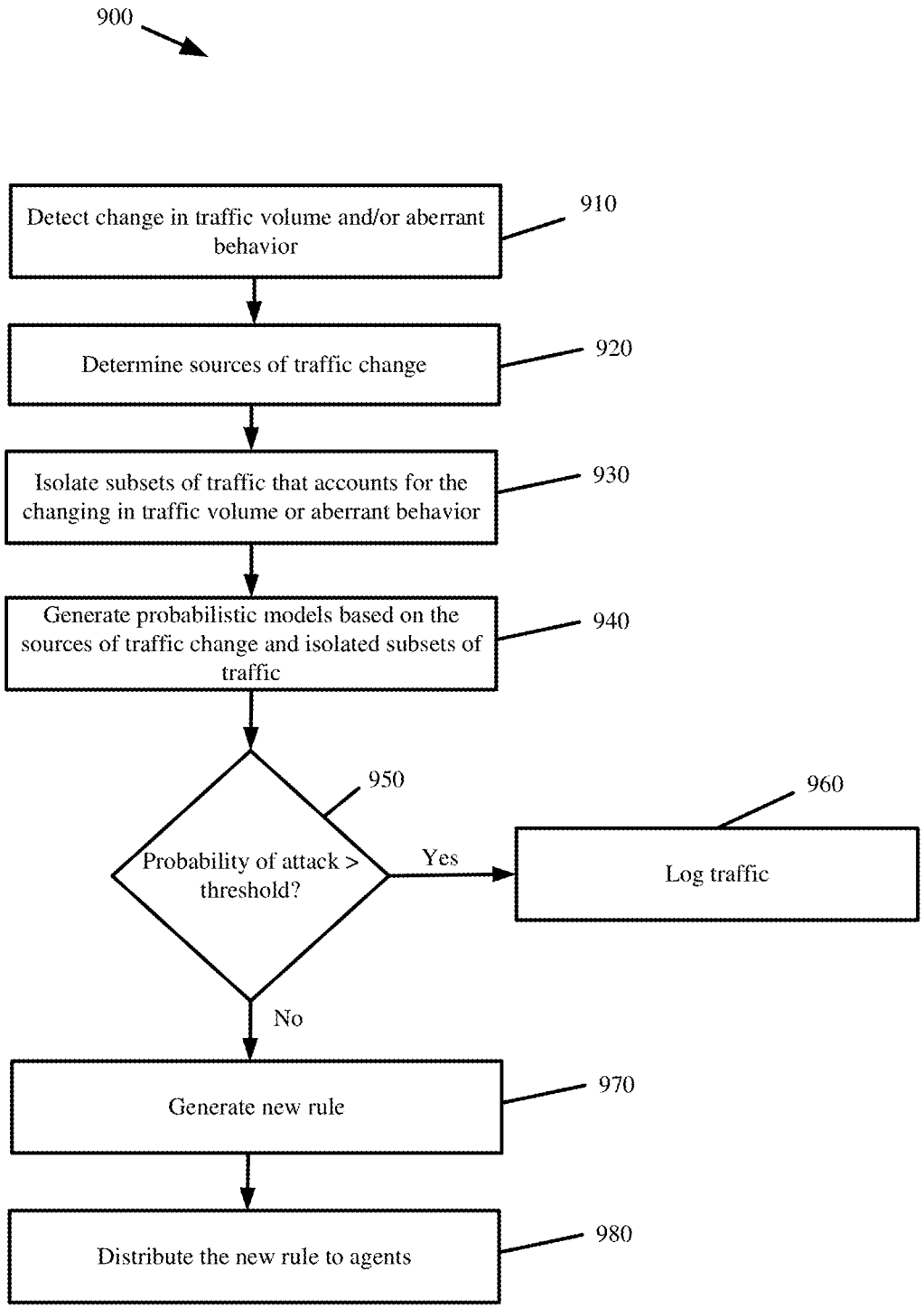
FIG. 9 presents an example process for dynamic rule generation via machine learning and/or artificial intelligence in accordance with some embodiments presented herein.

FIG. 9 presents an example process 900 for dynamic rule generation via machine learning and/or artificial intelligence in accordance with some embodiments presented herein. Process 900 may be performed by controller 620 and/or machine learning or artificial intelligence components of selective rate limiting system 105.

Process 900 may include detecting (at 910) a change in traffic volume and/or detecting aberrant behavior at a node or location of a distributed platform. For instance, controller 620 may detect a spike in traffic at a particular distributed platform node or location based on the number signals and/or other data coming from an agent 610 that protects that particular distributed platform node or location. The spike in traffic may not result in any attack protections of configured rules being activated, but the change in traffic volume may be indicative of a new attack that is not protected by the configured rules. In some embodiments, controller 620 may perform periodic health checks on agents 610 and/or the distributed platform nodes, and may identify any aberrant behavior (e.g., service failures, network failures, excess resource utilization, too many requests that result in certain errors, and/or other failures) that disrupt the distributed platform operation.

Process 900 may include determining (at 920) the sources contributing to the change in traffic volume. For instance, controller 620 may determine that the change in traffic volume is due to one or more specific clients. In determining (at 920) the source of the traffic volume change, controller 620 may further determine if the identified clients responsible for the change in traffic volume were previously sending traffic at lower rates or are previously unknown clients. Traffic surges from previously unknown clients may indicate a new attack. The determination can be based on controller 620 storing client identifiers from prior traffic with a value corresponding to a percentage or amount of traffic detected from those client identifiers. Controller 620 may also determine any relationships between the responsible sources for the change in traffic volume. For instance, controller 620 may detect that the traffic volume is originating from a common Autonomous System ("AS"), Internet service provider ("ISP"), subnet, and/or identifiable grouping.

Process 900 may include isolating (at 930) subsets of traffic that account for the change in traffic volume and/or the aberrant behavior. For instance, controller 620 may isolate (at 930) requests that are directed to a particular path, requests with a common header signature, requests to a particular service, requests with an iterating parameter, and/or other patterns or commonality detected within the traffic, and that account for the change in the traffic volume (e.g., traffic that represents a majority or change in the received traffic) or that result in the aberrant behavior.

Process 900 may include generating (at 940) one or more probabilistic models. The probabilistic models may identify different probabilities that the change in traffic volume is an attack via decision trees or clusters that may generated using a random forest classifier. The probabilistic models may be based on the determined (at 920) sources contributing to the change in traffic volume and the isolated (at 930) subset of traffic.

In some embodiments, each probabilistic model may provide a different probability for one or more different clients, that are determined as a source of the traffic volume change, and for different types or subsets of isolated traffic. For instance, if part of a traffic surge is due to a first set of clients with a known history of access and part of the traffic surge is due to a second set of clients without a prior history of access, then the probabilistic models may attribute a higher probability of an attack to the second set of clients than the first set of clients. Similarly, if part of the traffic surge is directed to newly accessible content and part of the traffic surge is directed to a secure database, then the probabilistic models may attribute a higher probability of attack to the isolated traffic that is directed to the secure database than the isolated traffic that is directed to the newly accessible content. Accordingly, the different probabilistic models may include decision trees or clusters with different groupings of clients identified as the sources of the traffic change and/or different groupings of traffic (e.g., request headers, URLs, metadata, and/or other message data) that account for the traffic volume change, and with different attack probabilities being computed and assigned to each grouping.

Process 900 may include determining (at 950) if the probability of an attack, as identified by any of the probabilistic models, is greater than a specified threshold. In response to determining (at 950—No) that the probability of an attack computed from each of the probabilistic models is less than the specified threshold, process 900 may include logging (at 960) the traffic for manual review. In response to determining (at 950—Yes) that the probability of an attack associated with a particular probabilistic model is greater than the specified threshold, process 900 may include generating (at 970) a new rule that protects against the subset of clients and/or traffic that are associated with the particular probabilistic model and/or that are identified as creating the traffic that is suspected to be an attack. Generating (at 970) the new rule may include automatically defining a rule definition based on common traffic dimensions of the isolated subset of traffic that is suspected of being attack traffic, creating one or more new signals for differentiating the suspected attack traffic from other traffic, setting a threshold for initiating attack protections, and/or defining actions for the attack protections. Process 900 may include distributing (at 980) the generated new rule to agents 610, and/or providing the new rule to a system administrator to decide whether or not to implement the new rule with agents 610.

Figure 10:
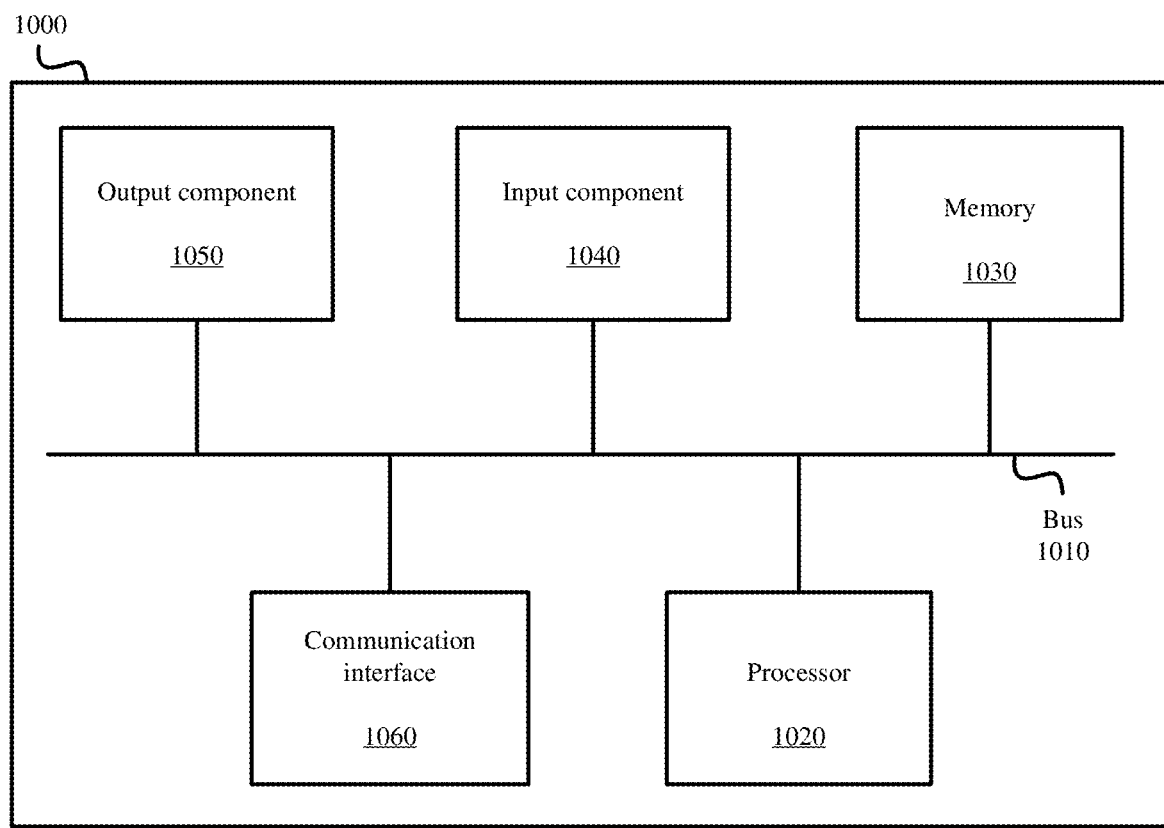
FIG. 10 illustrates example components of one or more devices, according to one or more embodiments described herein.

FIG. 10 is a diagram of example components of device 1000. Device 1000 may be used to implement one or more of the devices or systems described above (e.g., agents 610, controller 620, distributed platform nodes, etc.). Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a packet from a client device;
   inspecting the packet using a plurality of rules, wherein each rule of the plurality of rules comprises at least one different (i) rule definition with traffic dimensions identifying a different attack, (ii) signal with which to differentiate attack traffic with the traffic dimensions of a specific attack from other traffic, (iii) threshold specifying a condition, and (iv) action to implement based on the condition of the threshold being satisfied;
   providing a particular signal to the packet in response to the packet matching the traffic dimensions from the rule definition of a particular rule from the plurality of rules, and wherein the particular rule differentiates the attack traffic of a particular attack with the particular signal;
   updating a value in response to providing the particular signal to the packet, wherein the value tracks a number of times the particular signal is provided to packets associated with a client identifier of the client device; and
   implementing the action of the particular rule in response to the value being associated with the particular signal, the particular signal being associated with the particular rule, the particular rule being defined with the threshold, and the value satisfying the condition for the threshold of the particular rule.

2. The method of claim 1,
   wherein inspecting the packet comprises comparing one or more of a header, Uniform Resource Locator ("URL"), metadata, and message body of the packet against the traffic dimensions from the rule definition of the plurality of rules at an agent that is collocated with a node that is an intended recipient of the packet, and
   wherein the traffic dimensions comprise at least one specific value for a specific field of the header, a specific parameter or query string argument of the URL, a metadata key-value pair, or specific data in the message body.

3. The method of claim 2,
   wherein providing the particular signal comprises passing the particular signal and the client identifier from the agent to a controller that is remote from the agent and the node; and
   wherein implementing the action comprises providing the action from the controller to the agent in response to the controller determining that the value, that is linked to the particular signal and the client identifier satisfies the condition for the threshold of the particular rule.

4. The method of claim 1 further comprising:
   receiving a second packet and a third packet from the client device;
   blocking the second packet from a node that is an intended recipient of the second packet in response to implementing the action against the second packet and the second packet being provided with the particular signal as a result of the second packet matching the traffic dimensions from the rule definition of the particular rule; and
   issuing the third packet to the node in response to the third packet not being subject to the action as a result of the third packet not containing the traffic dimensions from the rule definition of the particular rule.

5. The method of claim 1,
   wherein receiving the packet comprises receiving the packet at a first agent of a plurality of agents, wherein each agent of the plurality of agents provides attack protections for a different node of a plurality of nodes forming a distributed platform;
   wherein implementing the action comprises configuring each agent of the plurality of agents with a blocking action that prevents any packet with the client identifier from reaching an intended node of the plurality of nodes; and
   blocking a second packet that is issued by the client device and that arrives at a second agent of the plurality of agents before reaching a node of the plurality of nodes in response to configuring the plurality of agents.

6. The method of claim 5,
   wherein the second packet omits the particular signal as a result of the second packet not containing the traffic dimensions from the rule definition of the particular rule.

7. The method of claim 1,
   wherein the value corresponds to a request rate at which the client device issues a plurality of packets that match the traffic dimensions from the rule definition of the particular rule, and wherein the plurality of packets are distributed across a plurality of agents that protect a plurality of nodes of a distributed platform from attack.

8. The method of claim 1 further comprising:
inspecting a response that is issued by a server in response to the packet from the client device; and
wherein providing the particular signal comprises:
   providing a first signal in response to the packet matching a first set of traffic dimensions from the rule definition of the particular rule; and
   providing a different second signal in response to the response matching a second set of traffic dimensions from the rule definition of the particular rule.

9. The method of claim 1 further comprising:
receiving a second packet from a different second client device;
providing a second signal and a third signal to the second packet in response to the second packet matching the traffic dimensions from the rule definition of a second rule from the plurality of rules, and wherein the second signal and the third signal are different than the particular signal, the second rule is different than the particular rule, and the rule definition of the second rule is different than the rule definition of the particular rule;
updating a second value that is linked to the second signal, the third signal, and a second client identifier of the second client device; and
implementing a second action of the second rule in response to the second value satisfying the condition for the threshold of the second rule, wherein the second action is different than the action of the particular rule.

10. The method of claim 1 further comprising:
issuing the packet to a node identified as an intended recipient of the packet while the action is inactive in response to the value not satisfying the condition for the threshold of the particular rule.

11. The method of claim 1,
wherein implementing the action comprises restricting the action to one of:
   packets identified with the particular signal and having the client identifier;
   all packets that are sent and have the client identifier;
   all packets identified with the particular signal and any client identifier; and
   packets identified with at least a second signal that is different than the particular signal.

12. The method of claim 1 further comprising:
deactivating the action after an expiration value specified by the particular rule is reached.

13. The method of claim 1,
wherein providing the particular signal comprises adding the particular signal to one of the packet header, URL, or metadata.

14. The method of claim 1, wherein providing the particular signal comprises:
inserting the particular signal as a new header value of the packet or a new parameter of the packet URL.

15. The method of claim 1 further comprising:
providing a graphical user interface with interactive controls used to configure the rule definition, signal, threshold, and action of a new rule; and
adding the new rule to the plurality of rules.

16. The method of claim 1,
wherein implementing the action comprises providing one or more client identifiers for client devices subject to the action, and one or more signals identifying specific traffic from the client devices that is subject to the action.

17. A system comprising:
a plurality of agent devices collocated with different nodes of a distributed platform at which different services, content, or data of the distributed platform may be accessed, wherein at least one agent device of the plurality of agent devices comprises one or more processors that are configured to:
   receive a packet from a client device;
   inspect the packet using a plurality of rules, wherein each rule of the plurality of rules comprises at least one different (i) rule definition with traffic dimensions identifying a different attack, (ii) signal with which to differentiate attack traffic with the traffic dimensions of a specific attack from other traffic, (iii) threshold specifying a condition, and (iv) action to implement based on the condition of the threshold being satisfied; and
   provide a particular signal to the packet in response to the packet matching the traffic dimensions from the rule definition of a particular rule from the plurality of rules, and wherein the particular rule differentiates the attack traffic of a particular attack with the particular signal;
a controller device that is located remote from the plurality of agent devices, wherein the controller device comprises one or more processors that are configured to:
   update a value in response to the at least one agent device providing the particular signal to the packet, wherein the value tracks a number of times the particular signal is provided to packets associated with a client identifier of the client device; and
   implement the action of the particular rule across the plurality of agent devices in response to the value being associated with the particular signal, the particular signal being associated with the particular rule, the particular rule being defined with the threshold, and the value satisfying the condition for the threshold of the particular rule.

18. The system of claim 17,
wherein the at least one agent device corresponds to a first agent device of the plurality of agent devices; and
wherein a second agent device of the plurality of agent devices comprises one or more processors that are configured to:
   block a second packet that is issued by the client device and that arrives at the second agent device before reaching a node of the distributed platform in response to implementing the action.

19. The system of claim 17,
wherein the one or more processors of the at least one agent device are further configured to:
   block a second packet that arrives at the at least one agent device before reaching a node of the distributed platform in response to implementing the action and the second packet being identified with at least one of the client identifier and the particular signal; and
   issue a third packet that arrives at the at least one agent device to the node in response to implementing the action and the third packet being identified with a second client identifier and zero or more signals that are different than the client identifier and the particular signal.

20. A non-transitory computer-readable medium, storing a plurality of processor-executable instructions to:
receive a packet from a client device;

inspect the packet using a plurality of rules, wherein each rule of the plurality of rules comprises at least one different (i) rule definition with traffic dimensions identifying a different attack, (ii) signal with which to differentiate attack traffic with the traffic dimensions of a specific attack from other traffic, (iii) threshold specifying a condition, and (iv) action to implement based on the condition of the threshold being satisfied;

provide a particular signal to the packet in response to the packet matching the traffic dimensions from the rule definition of a particular rule from the plurality of rules, and wherein the particular rule differentiates the attack traffic of a particular attack with the particular signal;

update a value in response to providing the particular signal to the packet, wherein the value tracks a number of times the particular signal is provided to packets associated with a client identifier of the client device; and implement the action of the particular rule in response to the value being associated with the particular signal, the particular signal being associated with the particular rule, the particular rule being defined with the threshold, and the value satisfying the condition for the threshold of the particular rule.

* * * * *